United States Patent Office 3,546,125
Patented Dec. 8, 1970

3,546,125
STABILIZATION OF 1,1,1-TRICHLOROETHANE
Wesley L. Archer, Midland, and Elbert L. Simpson, Auburn, Mich., assignors to The Dow Chemical Company, Midland, Mich., a corporation of Delaware
No Drawing. Filed Dec. 1, 1967, Ser. No. 687,120
Int. Cl. C09d 9/00; C11d 7/50; C23g 5/02
U.S. Cl. 252—171
5 Claims

ABSTRACT OF THE DISCLOSURE

The reaction of 1,1,1-trichloroethane with aluminum is inhibited by the presence in the 1,1,1-trichloroethane of a small amount of a dissolved aromatic diamine of which at least one amine group is a tertiary amine. Concentrations of the order of 0.005–1 gram mole per liter provide significant inhibition.

BACKGROUND OF THE INVENTION

This invention relates to the stabilization of chlorinated solvents. More particularly, the present invention concerns the stabilization of 1,1,1-trichloroethane in the presence of metallic aluminum.

Chlorinated hydrocarbons such as trichloroethylene and perchloroethylene are commonly used as solvents in chemical processes, dry cleaning, and metal degreasing. Solvents of this type are subject to slow decomposition and oxidation reactions, particularly in the presence of impurities such as water, traces of acid or metal salts. Corrosion of metal surfaces in containers and process equipment and deterioration of solvent quality by formation of acidic and colored byproducts thereby become serious problems. Inhibitors such as acid scavengers and antioxidants are commonly added to these solvents in order to prevent such degradative reactions. Inhibitor concentrations are normally of the order of one percent by weight or less.

1,1,1-trichloroethane poses a different and a particularly difficult stabilization problem because of its unusual reactivity with certain metals, notably aluminum. Traces of metal salts, moisture, or other impurities are not needed to initiate the 1,1,1-trichloroethane-aluminum reaction, for this reaction occurs spontaneously on a freshly exposed aluminum surface with spectacular results, converting the solvent and the metal surface in a few minutes to a blackened mass of acidic, carbonaceous material and aluminum salts. Conventional acid acceptor stabilizers cannot be depended upon to inhibit the aluminum-1,1,1-trichloroethane reaction and suitable inhibitors must be discovered by independent investigation. The search has yielded few effective compounds and these show little or no obvious pattern of structure. Typical 1,1,1-trichloroethane formulations contain about five percent by weight of inhibitor which is usually a combination of compounds to inhibit reaction of the solvent with a variety of metals.

SUMMARY OF THE INVENTION

It has now been found that the 1,1,1-trichloroethane-aluminum reaction can be substantially retarded or prevented by incorporating into the 1,1,1-trichloroethane an inhibiting amount of an aromatic diamine of the formula

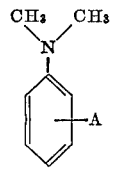

wherein A is one of the radicals —NH₂, —N(CH₃)₂, and

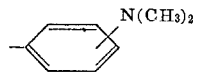

Preferably, the orientation of the amino substituents on the benzene ring is ortho or para. Mixtures of one or more of such compounds can be employed.

DETAILED DESCRIPTION

Only a quantity of aromatic diamine compound sufficient to retard or to stop the reaction of aluminum and 1,1,1-trichloroethane need be used. Although any significant amount will provide some inhibition, preferably about 0.005–1 gram mole per liter of 1,1,1-trichloroethane composition is employed and about 0.01–0.1 gram mole is usually most preferred. The activity of such amines in inhibiting the 1,1,1-trichloroethane-aluminum reaction is surprising, for similar amines are taught by the prior art to be useful for this purpose only when used in combination with other types of compounds.

Aromatic diamines as defined by the general formula set forth above were tested for inhibiting activity in elongated glass test tubes having an inside diameter of 0.8 cm. and 33 cm. in length. To each vertically disposed tube there was added 0.54 g. of essentially pure 16–32 mesh graular aluminum and a solution of the inhibitor in purified 1,1,1-trichloroethane to make a total volume of test mixture of 5 ml. The closed ends of the test tubes were then immersed in an oil bath held at a temperature sufficient to maintain the 1,1,1-trichloroethane solution in each tube at a steady reflux. The results listed in the following examples indicate the minimum concentration of the inhibitor found effetcive to provide complete inhibition of the 1,1,1-trichloroethane-aluminum reaction for 24 hours under these conditions. Prevention of the reaction for this length of time under the described conditions indicates capacity for effective inhibition for an indefinite period. Concentrations are given in gram moles per liter, this figure being convertible to weight percent by the equation $$\text{wt. \%} = \frac{(\text{moles/liter}) \ (\text{mol. wt. of inhibitor})}{13.46}$$

For example, a concentration of 0.10 g. mole per liter of an inhibitor of molecular weight 134.6 is equal to 1.0 weight percent of that inhibitor.

| Example No. | Compound name | Effective concentration g. moles per liter |
|---|---|---|
| 1 | N,N-dimethyl-p-phenylenediamine | 0.013 |
| 2 | N,N,N',N'-tetramethyl-o-phenylenediamine | 0.09 |
| 3 | N,N,N',N'-tetramethylbenzidine | 0.013 |

We claim:
1. A 1,1,1 - trichloroethane composition stabilized against reaction with aluminum by having dissolved therein a stabilizing amount of an inhibitor consisting of at least one compound of the formula

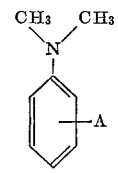

wherein A is one of the radicals —NH₂, —N(CH₃)₂, and

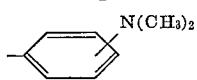

2. The composition of claim 1 wherein the inhibitor is present in a concentration of 0.005–1 gram mole per liter of composition.

3. The composition of claim 1 wherein the inhibitor is N,N-dimethyl-p-phenylenediamine.

4. The composition of claim 1 wherein the inhibitor is N,N,N′,N′-tetramethyl-o-phenylenediamine.

5. The composition of claim 1 wherein the inhibitor is N,N,N′,N′-tetramethylbenzidine.

References Cited

UNITED STATES PATENTS

| 2,451,642 | 10/1948 | Watson | 252—401 |
| 3,159,582 | 12/1964 | Sims | 252—171 |
| 3,189,552 | 6/1965 | Sims | 252—171 |

LEON D. ROSDOL, Primary Examiner

W. E. SCHULZ, Assistant Examiner

U.S. Cl. X.R.

252—153, 364, 401; 260—652.5